United States Patent
Climent et al.

(10) Patent No.: US 10,132,938 B2
(45) Date of Patent: Nov. 20, 2018

(54) INTEGRATED NUCLEAR SENSOR

(71) Applicant: GE Energy Oilfield Technology, Inc., Broussard, LA (US)

(72) Inventors: Helene Climent, Sugar Land, TX (US); Amin Radi, Seabrook, TX (US)

(73) Assignee: GE Energy Oilfield Technology, Inc., Broussard, LA (US)

( * ) Notice: Subject to any disclaimer, the term of this patent is extended or adjusted under 35 U.S.C. 154(b) by 0 days.

(21) Appl. No.: 15/077,884

(22) Filed: Mar. 22, 2016

(65) Prior Publication Data

US 2017/0276804 A1   Sep. 28, 2017

(51) Int. Cl.
| | |
|---|---|
| *G01V 5/04* | (2006.01) |
| *G01T 1/20* | (2006.01) |
| *G01V 5/06* | (2006.01) |
| *G01V 5/08* | (2006.01) |
| *G01T 1/202* | (2006.01) |

(52) U.S. Cl.
CPC ............ *G01T 1/2002* (2013.01); *G01T 1/202* (2013.01); *G01T 1/2018* (2013.01); *G01V 5/04* (2013.01); *G01V 5/06* (2013.01); *G01V 5/08* (2013.01)

(58) Field of Classification Search
CPC ....... G01T 1/2002; G01T 1/2018; G01V 5/06; G01V 5/08
USPC .......................... 250/256, 370.11, 372, 252.1
See application file for complete search history.

(56) References Cited

U.S. PATENT DOCUMENTS

| | | | |
|---|---|---|---|
| 4,883,956 A | 11/1989 | Melcher et al. | |
| 5,047,635 A | 9/1991 | Leaney et al. | |
| 5,742,057 A | 4/1998 | Frederick et al. | |
| 5,869,836 A * | 2/1999 | Linden | G01V 5/04 250/256 |
| 6,538,576 B1 | 3/2003 | Schultz | |
| 7,034,305 B2 | 4/2006 | Frederick et al. | |
| 7,247,853 B2 | 7/2007 | Frederick et al. | |
| 7,485,868 B2 * | 2/2009 | Stein | G01T 1/208 250/370.11 |
| 7,560,703 B1 * | 7/2009 | Soltz | H01J 37/244 250/310 |
| 7,763,845 B2 | 7/2010 | Estes et al. | |
| 7,939,808 B1 | 5/2011 | Shah et al. | |
| 7,977,645 B1 | 7/2011 | Shah et al. | |

(Continued)

FOREIGN PATENT DOCUMENTS

| | | |
|---|---|---|
| EP | 1 645 891 A1 | 4/2006 |
| EP | 1865043 | 12/2007 |
| WO | WO2015183563 | 12/2015 |

OTHER PUBLICATIONS

International Search Report and Written Opinion issued in connection with corresponding PCT Application No. PCT/US2017/022856 dated Jun. 16, 2017.

*Primary Examiner* — David Porta
*Assistant Examiner* — Abra Fein
(74) *Attorney, Agent, or Firm* — Crowe & Dunlevy, P.C.

(57) ABSTRACT

An integrated nuclear sensor includes a scintillator connected directly to the photocathode of a photomultiplier tube. The scintillator may be thermally fused to the photocathode. The scintillator can be supported within a scintillator housing by a potting layer that is formed from an elastomer. The scintillator can include a reflector or a reflective coating applied to the outside surface of the scintillator. The reflective coating can be a vapor deposition coating applied to the scintillator.

18 Claims, 4 Drawing Sheets

(56) References Cited

U.S. PATENT DOCUMENTS

| | | | |
|---|---|---|---|
| 8,853,617 B1 | 10/2014 | Stephenson | |
| 2002/0134937 A1* | 9/2002 | Taylor | H01J 37/244 250/311 |
| 2005/0023472 A1* | 2/2005 | Wei | G01T 1/2002 250/368 |
| 2005/0258371 A1* | 11/2005 | Stein | G01T 1/40 250/370.11 |
| 2006/0081786 A1* | 4/2006 | Berthold | G01T 1/208 250/370.11 |
| 2007/0138399 A1* | 6/2007 | Simonetti et al. | G01T 1/20 250/370.11 |
| 2009/0146065 A1 | 6/2009 | Srivastava et al. | |
| 2009/0283687 A1 | 11/2009 | Menge et al. | |
| 2012/0193539 A1* | 8/2012 | Bizarri | C09K 11/7733 250/361 R |
| 2013/0277562 A1* | 10/2013 | Wraight | G01T 1/202 250/362 |
| 2015/0285942 A1 | 10/2015 | Soloviev et al. | |

* cited by examiner

INTEGRATED NUCLEAR SENSOR

BACKGROUND

Downhole logging systems have been used for many years to evaluate the characteristics of the wellbore, including the liquid-gas fraction of fluids in the wellbore and the lithology of the surrounding geologic formations. Induced gamma ray radiation has been used in many prior art logging systems. Such downhole monitoring tools are provided with a gamma ray emitter that includes a low-energy radioisotope (e.g., Americium-241) and a gamma ray detector. The extent to which the emitted gamma rays are attenuated or back scattered before reaching the detector provides an indication of the bulk density of the wellbore fluid and formations surrounding the monitoring tool. Scintillation detectors are also used to detector and report neutron radiation.

Prior art nuclear detectors include a scintillator and vacuum photomultiplier tube. The scintillator emits light in response to gamma ray radiation. The vacuum photomultiplier tube (PMT) converts the light emitted from the scintillator into an electric signal that is representative of the incident gamma ray radiation. The scintillator is retained within the housing of the detector assembly with a metal sleeve. The scintillator may include a reflector that directs light emitted from the scintillator to the photocathode of the photomultiplier tube housing through a sapphire or quartz window.

Although widely accepted, current scintillator detector designs are complicated, difficult to manufacture and susceptible to failure when exposed to elevated temperatures or mechanical shock. There is, therefore, a continued need for a scintillator detector that overcomes these deficiencies in the current state of the art. It is to this and other needs that the preferred embodiments are directed.

BRIEF SUMMARY

In some embodiments, an integrated nuclear sensor may include a photomultiplier tube and/or a scintillator assembly.

In some embodiments, the photomultiplier tube may include a photocathode.

In some embodiments, the scintillator assembly may include a scintillator housing and/or a scintillator contained within the scintillator housing.

In some embodiments, the scintillator has a first end, a second end and a middle portion.

In some embodiments, the first end of the scintillator is connected directly to the photocathode of the photomultiplier.

In some embodiments, the first end of the scintillator is glued to the photocathode of the photomultiplier tube.

In some embodiments, the first end of the scintillator is thermally fused to the photocathode of the photomultiplier tube.

In some embodiments, such an integrated nuclear sensor may further include a reflector that surrounds the second end and the middle portion of the scintillator.

In some embodiments, the reflector may include a reflective tape wrapped around the scintillator.

In some embodiments, such an integrated nuclear sensor may further include a reflective coating on the scintillator.

In some embodiments, the reflective coating may include a metal deposition layer applied to the scintillator.

In some embodiments, the scintillator assembly may further include a metallic sleeve disposed between the scintillator housing and the scintillator.

In some embodiments, the scintillator assembly may further include an intermediate potting layer between the scintillator and the scintillator housing.

In some embodiments, the potting layer may include an elastomer layer into which the scintillator is molded.

In some embodiments, the potting layer may include an elastomer that is substantially optically transparent.

In some embodiments, the potting layer may include an elastomer that is reflective.

In some embodiments, the reflective coating is applied to the second end and the middle portion of the scintillator with a vapor deposition or similar process.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
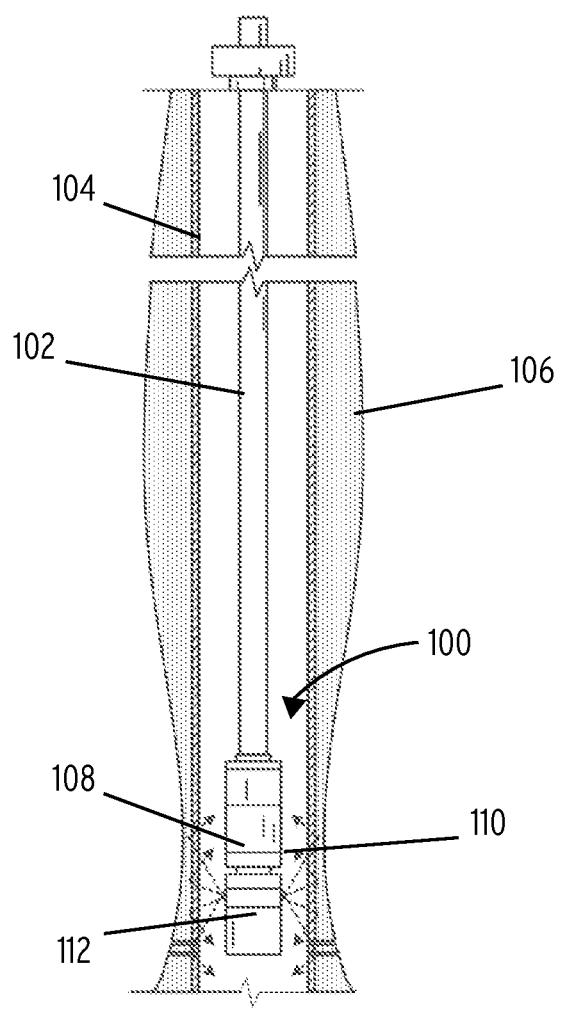
FIG. 1 illustrates an aspect of the subject matter in accordance with one embodiment.

In accordance with a present embodiment of the invention, FIG. 1 shows a downhole logging instrument 100 attached to the surface through a cable 102, wireline or series of pipes. The downhole logging instrument 100 and cable 102, wireline or connecting pipes are disposed in a wellbore 104, which is drilled for the production of a fluid such as water or petroleum from a geologic formation 106. As used herein, the term "petroleum" refers broadly to all mineral hydrocarbons, such as crude oil, gas and combinations of oil and gas.

The downhole logging instrument 100 may also include sensors, analyzers, control systems, power systems, data processors and communication systems, all of which are well-known in the art. It will be appreciated that the downhole logging instrument 100 may alternatively be configured as part of a larger downhole assembly. For example, in an alternate preferred embodiment, the downhole logging instrument 100 is attached to a submersible pumping system or as part of a measurement while drilling system. If the downhole logging instrument 100 is incorporated within a measurement while drilling system, the downhole logging instrument 100 may be powered by one or more batteries rather than through an umbilical extending to surface-based power supplies. Although demonstrated in a vertical wellbore 104, it will be appreciated that downhole logging instrument 100 may also be implemented in horizontal and non-vertical wellbores. The preferred embodiments may also find utility in surface pumping applications and in other applications in which a sensor or other sensitive component is exposed to the potential of shock and vibration.

The downhole logging instrument 100 includes a receiver 108 that in turn includes an internal detector assembly 110 configured to detect radiation. The detector assembly 110 can be configured to detect gamma ray radiation, neutron radiation or both forms of radiation. The receiver 108 may include additional components operably connected to the detector assembly 110, such as processing and communication electronics that place the receiver 108 in communication with other components of the downhole logging instrument 100 or surface-based facilities.

The downhole logging instrument 100 optionally includes an emitter 112 configured to produce gamma ray or neutron radiation at known energies. Alternatively, or in addition to the radiation produced by the emitter 112, the downhole logging instrument 100 can measure naturally-occurring radiation emanating from the geologic formation 106 surrounding the wellbore 104. In either embodiment, the radiation released from the emitter 112 or geologic formation 106 travels through the wellbore 104 to the receiver 108 through attenuation, reflection or back scatter, where it is measured and converted into measurement signals. The measurement signals can be interpreted to provide information regarding the characteristics of the wellbore 104, the fluid inside the wellbore 104 and the lithology of the surrounding geologic formation 106. Although the detector assembly 110 is disclosed in connection with use in a downhole logging instrument 100, it will be appreciated that the detector assembly 110 may also find utility in other, unrelated applications and environments.

Figure 2:
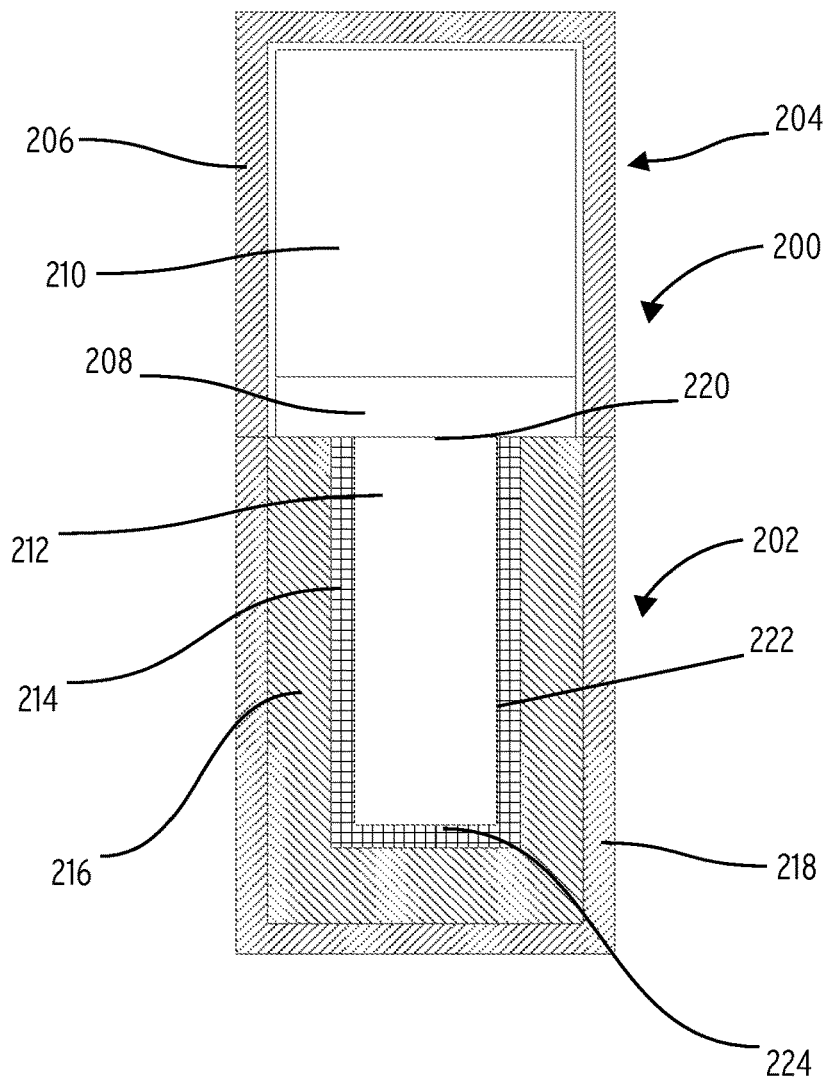
FIG. 2 provides a cross-sectional depiction of a first embodiment of the detector assembly.

Turning to FIG. 2, shown therein is a cross-sectional depiction of a first embodiment of a detector assembly 200. The detector assembly 200 includes a scintillator assembly 202 coupled to a photomultiplier tube assembly 204. The photomultiplier tube assembly 204 includes a photomultiplier tube housing 206 constructed from a rigid material. The photomultiplier tube assembly 204 also includes a photocathode 208 and a photomultiplier tube 210. When bombarded with photons, the photocathode 208 produces an electric signal that is amplified by the photomultiplier tube 210.

The scintillator assembly 202 includes a scintillator 212. The scintillator 212 can take a cylindrical or box form that includes a first end 220, a second end 224 and a middle portion 222. In some embodiments, the scintillator 212 is manufactured from praseodymium-doped lutetium aluminum garnet (LuAG:Pr) or cerium-activated lanthanum chloride (LaCL3:Ce). In response to incident gamma ray or neutron radiation, the scintillator 212 emits light in accordance with well-known principles. In these embodiments, the scintillator 212 is configured to emit light in response to incident radiation at a design wavelength that matches the design wavelength of the photomultiplier tube assembly 204.

Unlike prior art designs, the first end 220 of the scintillator 212 is coupled directly to the photocathode 208 without the use of an intervening light guide or window. The scintillator 212 can be secured directly to the photocathode 208 with an oil or adhesive that is substantially transparent. Suitable adhesives include elastomers that are substantially transparent. Suitable elastomers include silicone elastomers available from Dow Corning under the Sylgard 184 brand.

Alternatively, the scintillator 212 is thermally fused directly to the photocathode 208 without the use of any intervening adhesive. To thermally fuse the photocathode 208 and scintillator 212, one or both components are heated to a temperature just above the lower melting point exhibited by either the photocathode 208 or the scintillator 212.

The scintillator 212 may include a reflector 214 that surrounds the second end 224 and middle portion 222. The reflector 214 directs the emission of light through the first end 220 and into the photocathode 208. In some embodiments, the reflector 214 is constructed by wrapping the scintillator 212 with multiple passes of a reflective tape, such as white tape constructed from polytetrafluoroethylene (PTFE).

The scintillator assembly 202 further includes a metallic sleeve 216 and a scintillator housing 218. The metallic sleeve 216 is disposed between the reflector 214 and the scintillator housing 218 and isolates the scintillator 212 from mechanical shock and vibration. The metallic sleeve 216 may include a plurality of springs, fingers or beveled surfaces that provide a cushioned support for the scintillator 212 within the scintillator housing 218.

Figure 3:
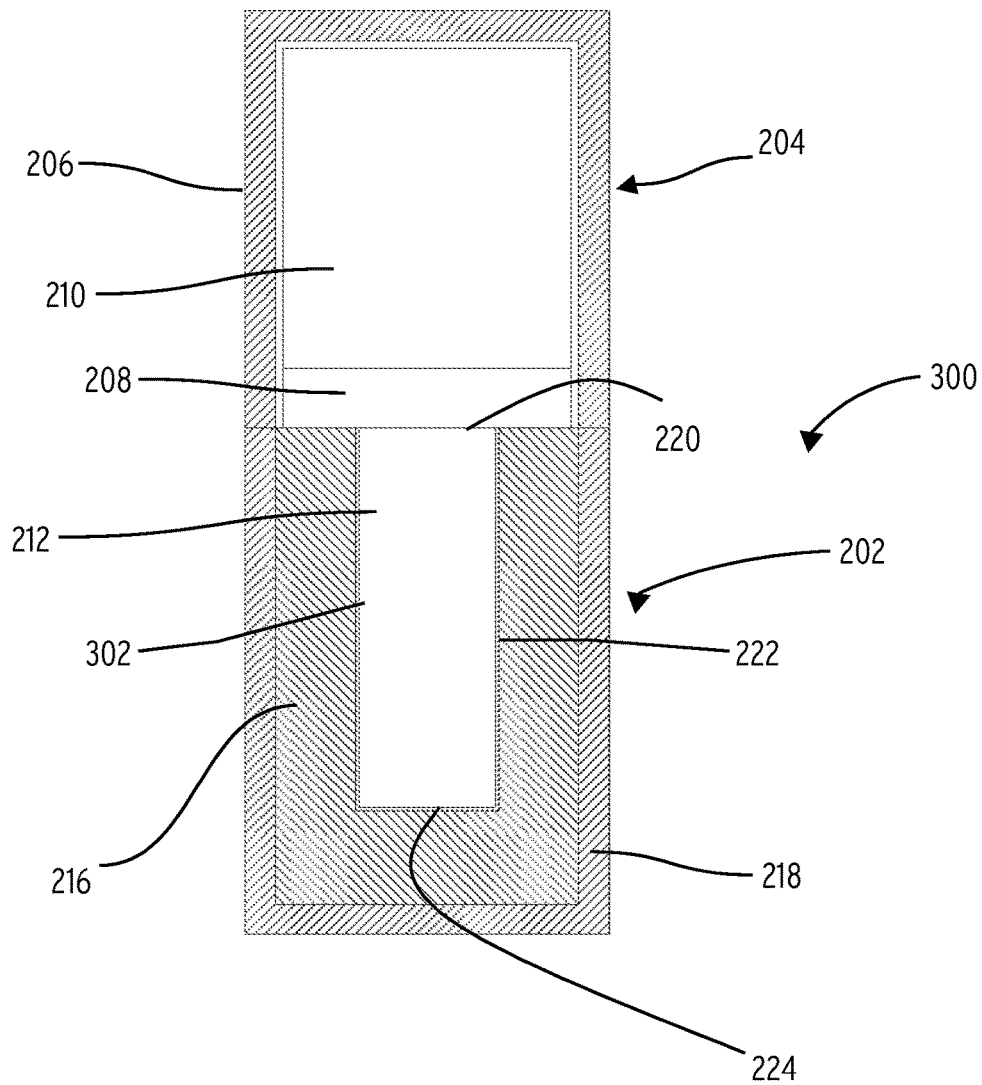
FIG. 3 illustrates an aspect of the subject matter in accordance with a second embodiment.

Turning to FIG. 3, shown therein is a cross-sectional depiction of a detector assembly 300. Unlike the detector assembly 200 illustrated in FIG. 2, the detector assembly 300 does not include a reflector 214. Instead, the scintillator 212 of the detector assembly 300 includes a reflective coating 302. The reflective coating 302 can be prepared by applying a reflective metallic coating to the scintillator 212 through a vapor deposition process. The reflective coating 302 is applied to the second end 224 and the middle portion 222 of the scintillator 212.

Figure 4:
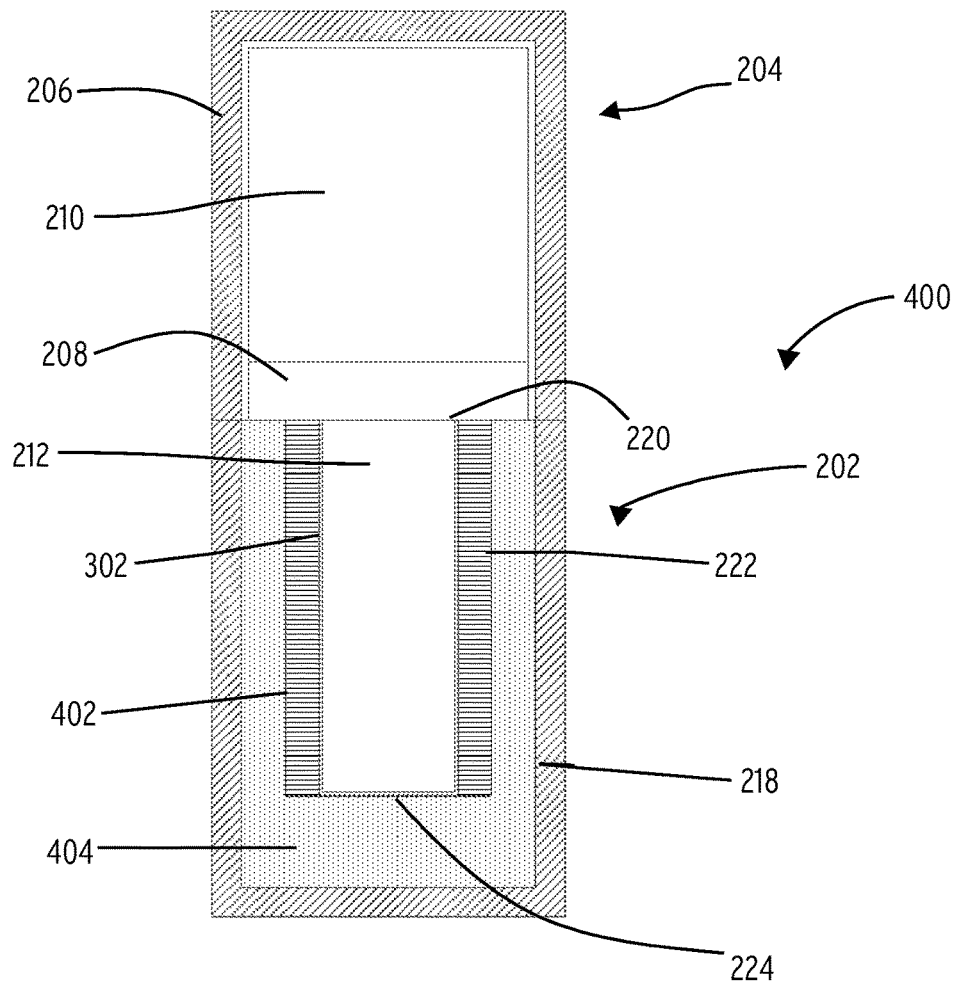
FIG. 4 illustrates an aspect of the subject matter in accordance with a third embodiment.

Turning to FIG. 4, shown therein is a cross-sectional depiction of a detector assembly 400. In this third embodiment, the detector assembly 400 does not include the metallic sleeve 216. Instead, the detector assembly 400 includes a potting layer 404 between the reflective coating 302 of the scintillator 212 and the scintillator housing 218. The potting layer 404 is manufactured from a compliant, shock-absorbing material. In an exemplary embodiment, the potting layer 404 is created by placing an uncured liquid elastomer into the scintillator housing 218 and then inserting the scintillator 212 into the liquid elastomer. Once cured, the potting layer 404 solidifies to an extent and tightly surrounds the scintillator 212 and isolates the scintillator 212 from external mechanical shock and vibration. The potting layer 404 also provides a hermetic seal around the scintillator 212, which reduces the absorption of water by the hygroscopic scintillator 212. It will be appreciated that the scintillator 212 may be fused or adhered to the photocathode 208 before or after insertion into the uncured potting layer 404.

In an alternative embodiment, the potting layer 404 is formed by an elastomer that exhibits reflective properties. Suitable elastomers include silicone elastomers that have been combined with white tints or pigments, or with reflective metallic particles. If the potting layer 404 is reflective, the reflective coating 302 on the scintillator 212 may be omitted, thereby reducing the costs associated with the manufacture of the detector assembly 400.

The detector assembly 400 optionally includes a barrier 402 between the potting layer 404 and the reflective coating 302 of the scintillator 212. The barrier 402 can be manufactured from a rubber or polymer sleeve that provides an additional level of shock absorption around the scintillator 212. In an embodiment, the barrier 402 is constructed by applying shrink tubing around the reflective coating 302 of the scintillator 212.

What is claimed is:

1. An integrated nuclear sensor comprising:
    a photomultiplier tube, wherein the photomultiplier tube includes a photocathode; and
    a scintillator assembly, wherein the scintillator assembly comprises:
        a scintillator housing; and
        a scintillator contained within the scintillator housing, wherein the scintillator has a first end, a second end and a middle portion, and wherein the first end of the scintillator is thermally fused directly to the photocathode of the photomultiplier with no intervening structure.

2. The integrated nuclear sensor of claim 1, further comprising a reflector that surrounds the second end and the middle portion of the scintillator.

3. The integrated nuclear sensor of claim 2, wherein the reflector comprises a reflective tape wrapped around the scintillator.

4. The integrated nuclear sensor of claim 1, further comprising a reflective coating on the scintillator.

5. The integrated nuclear sensor of claim 4, wherein the reflective coating comprises a metal deposition layer applied to the scintillator.

6. The integrated nuclear sensor of claim 1, wherein the scintillator assembly further comprises a metallic sleeve disposed between the scintillator housing and the scintillator.

7. The integrated nuclear sensor of claim 1, wherein the scintillator assembly further comprises an intermediate potting layer between the scintillator and the scintillator housing.

8. The integrated nuclear sensor of claim 7, wherein the potting layer comprises an elastomer layer into which the scintillator is molded.

9. The integrated nuclear sensor of claim 8, wherein the potting layer comprises an elastomer that is substantially optically transparent.

10. The integrated nuclear sensor of claim 8, wherein the potting layer comprises an elastomer that is reflective.

11. An integrated nuclear sensor comprising:
a photomultiplier tube, wherein the photomultiplier tube includes a photocathode; and
a scintillator assembly, wherein the scintillator assembly comprises:
a scintillator housing;
a scintillator contained within the scintillator housing, wherein the scintillator has a first end, a second end and a middle portion;
a reflective coating, wherein the reflective coating is applied to the second end and the middle portion of the scintillator; and
wherein the first end of the scintillator is directly connected to the photocathode with no intervening structure.

12. The integrated nuclear sensor of claim 11, wherein the reflective coating is applied to the second end and the middle portion of the scintillator with a vapor deposition process.

13. The integrated nuclear sensor of claim 11, wherein the first end of the scintillator is thermally fused to the photocathode.

14. The integrated nuclear sensor of claim 11, wherein the first end of the scintillator is secured directly to the photocathode with an adhesive.

15. An integrated nuclear sensor comprising:
a photomultiplier tube, wherein the photomultiplier tube includes a photocathode; and
a scintillator assembly, wherein the scintillator assembly comprises:
a scintillator housing;
a scintillator contained within the housing;
a potting layer between the scintillator and the scintillator housing; and
wherein the scintillator is thermally fused directly to the photocathode with no intervening structure.

16. The integrated nuclear sensor of claim 15, wherein the potting layer comprises an elastomer body into which the scintillator has been inserted.

17. The integrated nuclear sensor of claim 15, wherein the scintillator includes a reflective coating.

18. The integrated nuclear sensor of claim 17, wherein the reflective coating is a vapor deposition coating.

* * * * *